United States Patent Office 3,454,436
Patented July 8, 1969

3,454,436
POLY - β - HYDROXYAMINES PROPELLANT
COMPOSITIONS PREPARED WITH LITHIUM
PERCHLORATE
Stanley F. Bedell, Andover, Mass., assignor to Monsanto
Research Corporation, St. Louis, Mo., a corporation
of Delaware
No Drawing. Filed July 2, 1962, Ser. No. 207,461
Int. Cl. C06b *11/00*
U.S. Cl. 149—19                                    14 Claims This invention relates to solid solutions and more particularly, provides novel polymeric solid solutions of lithium perchlorate in a poly-β-hydroxyamine, novel methods of polymerizing, and novel propellant compositions comprising solid solutions as binders.

Conventional composite solid propellant compositions generally consist of an inorganic oxidant and a plastic binder, which also serves as a reductant-fuel of the system. The combination provides a heterogeneous composition for which the burning rate and stability to detonation are at least partially dependent on the particle size of the oxidant. The former property is improved as the particle size of the oxidant is reduced. However, milling to provide a finely divided oxidant is hazardous and periodic explosions are encountered.

It has been found that the stated composite propellant compositions are advantageously replaced by polymeric solid solutions of an oxidant, in which the oxidant is in the same homogeneous phase as a polymeric binder. The oxidant is then provided in a state of subdivision finer than any grinding can produce, while avoiding the hazards of milling. Moreover, it is found that dissolving the oxidant in the polymeric binder produces an unexpected decrease in the impact sensitivity of the binder-oxidant combination.

Putting the oxidant into the same phase as the binder also raises the available solids loading of the composition. There is a limit to the solids loading for a given amount of polymeric binder, above which not enough binder will be available to form a continuous phase binding the discontinuous solids phase into a unitary structure. In the conventional composite propellant, the solids phase includes oxidant for the binder. To the extent that the binder phase includes its own oxidant, in the same homogeneous phase as the binder, available solids loading is freed for the inclusion of other energetic components. Since oxidation of the polymeric binder usually contributes much less to the specific impulse of propellants than combination of the energetic solids components, the reduction in ratio of binder to total composition achieved by replacing composite systems with solid solutions is advantageous.

Furthermore, the solid solution propellants are denser than composites, and therefore their specific impulse for a given volume is higher. This results in a desirable reduction in size of rockets of a given range, or alternatively, means that a longer range is covered by a rocket of a given size.

A method found useful for preparing polymeric solid solutions comprises polymerizing a difunctional monomer with a diisocyanate in the presence of dissolved lithium perchlorate. Lithium perchlorate can be dissolved in or put in the same fluid phase as monomers reactive with diisocyanates such as diamines, with the amount in solution in the monomer system remaining in solution in the resulting polymer. However, lithium perchlorate is essentially insoluble in diisocyanates, and consequently this monomer makes no contribution to the amount of the perchlorate which can be put into solution.

It is an object of this invention to provide novel polymeric solid solutions.

A particular object of this invention is to provide a novel method of preparing a polymeric solid solution of lithium perchlorate wherein the polymerizable monomer system is characterized by total solvent power for solid perchlorate.

Another object is to provide novel polymeric solid solutions in which oxidant and polymer are in the same homogeneous phase, having a high oxidant concentration in solution therein.

Another object is to provide novel propellant compositions wherein the binder is a novel polymeric solid solution of an oxidant.

These and other objects will become evident from a consideration of the following specification and claims.

It has now been found that polymeric solid solutions of an oxidant are advantageously prepared by polymerizing a diepoxide with a diamine in the presence of dissolved lithium perchlorate. The products are novel poly-β-hydroxyamine polymeric solid solutions containing unusually high proportions of dissolved lithium perchlorate, which are advantageously adapted for use in propellant compositions, and particularly as solid propellant binders.

The utility of lithium perchlorate for preparation of polymerizable fluid diamine solutions of an oxidant is unique. The perchlorate oxidants used to prepare rocket propellants include ammonium perchlorate and the perchlorates of the light alkali metals: sodium, potassium and lithium. If ammonium perchlorate is heated with a diamine, reaction occurs, ammonia is evolved, and the product is the perchloric acid salt of the diamine. Salts of the light metals tend to be coordinated chiefly by oxygen, while the coordinating power of amine nitrogen therefore is generally weak, and amines have essentially no solvating power for sodium and potassium salts. Indeed, on addition of increments of lithium perchlorate to an aliphatic diamine at temperatures up to about 100° C. a solids phase is observed to be present before as much as a mole of lithium perchlorate per mole of the diamine has been introduced. However, it has been established that by combining lithium perchlorate with a diamine in an amount in excess of one mole of the salt per mole of the diamine, completely fluid mixtures are obtained at favorable temperatures, generally below about 100° C. These fluid mixtures are, it has been established, in fact eutectics of lithium perchlorate with a 1:1 chelate coordination compound of the perchlorate and the diamine, but in effect they can generally be regarded and employed as solutions of the perchlorate in the diamine.

Diepoxides can polymerize by different modes, depending on the epoxide and the system. For example, they may self-polymerize, in the presence of a catalyst such as boron trifluoride, or they may copolymerize, in such a manner as to incorporate residues of substances other than the epoxide into the polymer chain. The latter type of polymerization may be produced with difunctional alcohols, acids (or anhydrides) and amines, depending on the epoxide and the system. Amines may catalyze homopolymerization of diepoxides or be copolymerized with the epoxide. If the diepoxide is polymerized by a diamine to effect copolymerization, the product is a poly-β-hydroxyamine, having a formula consisting of recurring units such as:

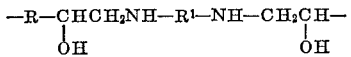

where the

unit is the residue of the epoxy group.

It has now been found that lithium perchlorate is soluble in diepoxides, which is advantageous because this is the only presently known such polymerization system in which lithium perchlorate can be dissolved in both monomers. As mentioned above, lithium perchlorate is insoluble in a diisocyanate.

Moreover, it is found that diepoxide can be polymerized to a poly-β-hydroxyamine in the presence of the dissolved lithium perchlorate. Since the perchlorate is coordinated to the amine nitrogen atoms, the basicity of the system is altered. Indeed, probably the perchlorate is also coordinated to the oxygen in the epoxy group, altering its reactivity also. In any case, it is found that not only does the polymerization nevertheless occur, but actually the perchlorate promotes the polymerization, and systems which fail to polymerize or polymerize only slowly in its absence, readily react to form the desired polymer.

Additionally, it has been found that during the polymerization, lithium perchlorate initially undissolved goes into solution. This is an unusual occurrence in the preparation of polymeric solid solutions. Ordinarily only the amount of the perchlorate dissolved in the monomer system is obtained in solution in the polymer.

Thus the present system offers a number of unexpected and desirable advantageous qualities.

Referring now in more detail to the practice of this invention, for catalytic effects, usually from about 0.001 to about 0.5 part of lithium perchlorate, and more particularly, 0.01 to 0.20 part by weight per part of the perchlorate can be used to accelerate polymerization of an epoxide with a diamine to form a poly-β-hydroxyamine polymer.

The solid solution and propellant products of this invention will comprise polymeric solid solutions of an oxidant amount of lithium perchlorate and polymeric binder, in the same homogeneous phase.

By solid solution is meant that the perchlorate and the polymer are homogeneously mixed and in the same phase, to the extent that heterogeneity therebetween is not evident on examination under an ocular microscope.

By a polymeric binder is meant a matrix comprising polymer having a molecular weight at least sufficient to make the polymer solid at room temperature. It is undesirable to have the molecular weight so high that the polymer is infusible and insoluble. Preferably, the product will be sufficiently elastomeric to have a tensile strength of at least 50 pounds per square inch (p.s.i.) and ultimate elongation (at break) of at least 20%.

The perchlorate must be anhydrous, containing less than about 0.5 mole percent water, and in references to it, it is to be understood that anhydrous perchlorate is meant.

By an oxidant amount of the perchlorate is meant enough to supply the combustion oxidation requirements of a significant portion, which will be at least about half the oxidation requirements, of the polymer. Lithium perchlorate, LiClO$_4$, decomposes to LiCl and 2 moles of oxygen molecules per mole of perchlorate. Thus referring for example to oxidation of polymers including CH$_2$ and like hydrocarbon units, if the C atom forms CO and the hydrogen atoms form water, respectively, as gaseous oxidation products, the consumption of oxidant is 0.5 mole of lithium perchlorate per mole of methylene units so oxidized. Under certain conditions the hydrogen is not oxidized or is oxidized in part but a corresponding amount of a metal is. Thus the ratio of perchlorate to polymer to supply the oxidation requirements will be at least about 0.5 mole per mole of reduced carbon atoms in the polymer. To attain the benefits of this invention, at least half of this consumption requirement is supplied by dissolved lithium perchlorate in the same homogeneous phase as the polymer.

Preferably, all the oxygen requirement for oxidation of the polymer is supplied by dissolved lithium perchlorate. More than half and desirably all the oxygen requirement of the total composition may be supplied by this perchlorate.

The present compositions may consist essentially or entirely of the polymer and lithium perchlorate. Such compositions can be employed as such to produce propellant gases for rockets and the like by burning, or alternatively as explosives.

As will appear hereinafter, however, it is desirable to include other components in the composition, which may either be part of the same binder phase as the polymer, or part of the discontinuous solids phase combined with the binder. These may include fuels and oxidants, as further pointed out hereinafter. If these other compounds are fuels, they consume oxygen, and thus increase the total oxygen requirement of the composition. Where additional oxidant is included, the lithium perchlorate need not supply all the oxidant requirements of the composition, but to adapt the composition for propellant and fuel use, it is necessary that the composition include sufficient total oxidant to render combustion of the system self-supporting.

The quantity of lithium perchlorate desired in the final solid propellant composition will thus vary depending on the particular selection of ingredients. It may be up to about 80% of lithium perchlorate based on the total weight of the composition. It will be understood that substantially smaller amounts of the perchlorate may be employed in effective compositions, and the amounts are often in the region of about 4 or 5 to 15 or 16%.

The nature of the polymers in the novel products of this invention will be best appreciated from a consideration of the methods of this invention, as discussed below. In general they may be described as characterized by repeating units linked by amine bonds and having a hydroxyl group situated beta to said amine bonds. The repeating units will in many cases be hydrocarbon chains, such as alkylene and arylene units, but are not limited thereto: they may be substituted by non-interfering substituents, or interrupted by hetero atoms such as O, S or the like.

The polyamine monomers useful in preparing polymer in accordance with this invention are preferably aliphatic diamines such as ethylenediamine, trimethylenediamine, tetramethylenediamine, hexamethylenediamine, pentamethylenediamine, octamethylenediamine, decamethylenediamine, 3-methylhexamethylenediamine and the like. Polyamines such as 2,2'-iminobis(ethylamine), 3,3'-iminobis(n-propylamine), 3 - [(2 - aminoethyl)amino]propylamine and the like can also be used. A primary amine group is apt to be particularly active and it is sometimes desirable to employ amines having nitrogen substituents to moderate the vigor of the polymerization reaction. Thus for example, a secondary amine such as N-methylethylenediamine, N-methyltrimethylene diamine, N-butylethylenediamine, N,N'-dimethylhexamethylene diamine and the like may be employed as reactants. Aromatic, cycloaliphatic and like polyamines are also useful in the practice of this invention. For example, illustrative polyamines which may be employed in the present method include p-tolylene diamine, m-phenylenediamine, cyclohexylene diamine and the like. Other examples of presently useful polyamines are those including hetero atoms in the polymer chain such as 2,2'-diamino diethyl ether and sulfide, the bis(glycine) ester of ethylene glycol, and so forth.

The epoxy compounds are well known. The general characteristic of this class of materials is the presence of epoxy groups, which are of the formula

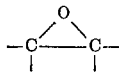

by the reaction of which the epoxy compound may be cured to give a solid, thermoset, resinous material. The polyepoxy compounds containing a plurality of terminal epoxy groups are frequently referred to as epoxy resins. Usually epoxy resins are of moderately high molecular weight, containing more than 10, and usually more than 20 carbon atoms per molecule.

Epoxy groups can be introduced into organic molecules, particularly cyclic organic compounds, by treatment of an aliphatic double bond with an appropriate oxidizing agent, or by reaction of a polyfunctional epoxy compound with a polyol, that is, a compound containing two or more hydroxy radicals, producing epoxy resins comprising one or more ether linkages joining organic radicals and terminating in epoxy groups.

One class of epoxy compounds useful in the process of this invention are the product of reaction of a polyfunctional epoxy compound with an aromatic polyhydric phenolic compound. The polyfunctional epoxy compound used in this connection may be a diepoxide, distinguished from the class of epoxy resins by its relatively low molecular weight, illustrative of which are diepoxybutadiene, bis (2,3-epoxy-2-methylpropyl) ether and the like. More usually, the polyfunctional epoxy compound is a haloepoxy compound, most commonly, epichlorohydrin. Reaction of epichlorohydrin, for example, with an aromatic polyhydric phenolic compound results in the formation of a polymer containing either linkages between arylene radicals derived from the initial aromatic polyhydric compound and hydroxyalkylene radicals derived from the initial haloepoxy compound, the polymers terminating in epoxyalkoxy radicals. The aromatic polyhydric compound may comprise a monocyclic phenol such as resorcinol, a polycyclic phenol such as p,p'-(dihydroxy)-biphenyl, a phenolic resin such as a phenol formaldehyde resin, and the like.

Illustrative of bisphenols which may be employed to produce the resins are, for example, p,p'-oxybisphenol, p,p'-methylenebisphenol, 2,2 - bis(4 - hydroxyphenyl)propane, 2,2-bis(4-hydroxy-2-methylphenyl)-propane, 2,2-bis(2-t-butyl - 4 - hydroxyphenyl)propane, 2,2 - bis(2,5-dimethyl-4-hydroxyphenyl)propane, 2,2 - bis(2-chloro-4-hydroxyphenyl)propane, 2,2 - bis(2 - bromo-6-fluoro-4-hydroxyphenyl)propane, 1,1-bis(4 - hydroxyphenyl)ethane, 1,1-bis(4-hydroxyphenyl)isobutane, 1,1-bis(2-isopropyl-4-hydroxyphenyl)isobutane, 2,2 - bis(4-hydroxyphenyl)butane, 4,4 - bis(4 - hydroxyphenyl)heptane, 1,1 - bis(4-hydroxyphenyl)dodecane, 2,2 - bis(4 - hydroxyphenyl)hexadecane, and the like.

Another class of epoxy resins commercially available and useful in the present process comprises aliphatic epoxy resins. Compounds of htis nature may, for example, be prepared by a process analogous to that employed in preparing an epoxy resin from a bisphenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, sorbitol and the like. A compound of this nature may be represented by the formula

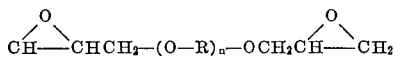

where R is an aliphatic group containing only C, H and O, and n is an integer, including zero.

In general, aliphatic chains produce more flexible resins than aromatic, and mixed aliphatic and aromatic chains may alternatively be introduced into an epoxy resin, using the aforedescribed procedures, producing resins of modified properties.

As mentioned above, epoxidized cycloaliphatic compounds such as a diepoxide of ethylene glycol bisdihydrodicyclopentadienyl ether, are also comprised within the class of epoxy resins curable to thermoset resinous products. These, and particularly the stated diepoxide, are a preferred class of epoxy resins for use in the practice of the present invention. Illustrative of other useful epoxidized cycloaliphatic resins are, for example, limonene diepoxide, dicyclopentadiene diepoxide, vinylcyclohexene diepoxide, 3,4-epoxy-6-methylcyclohexylmethyl 3,4-epoxy-6-methyl-cyclohexanecarboxylate, and the like.

Other feasible variations in epoxy resin structure will be known to the art. This invention contemplates the use of any of the variety of epoxy resins conventionally used in the industry for the production of resinous materials by curing processes.

It is frequently advantageous to employ hardeners in the epoxy systems, which lead to crosslinking of the polymer chains and consequent higher molecular weight. One method of accomplishing this is to include trifunctional monomers in the system. Thus for example, part of the diamine component may be replaced by a triamine such as diethylenetriamine, dipropylenetriamine, and the like. Another method of hardening the resin is to provide crosslinking through the hydroxy groups formed by ring opening of the epoxy groups. This may be effected, for example, by treatment with a polycarboxylic acid compound, which will esterify these hydroxy groups. Preferably an acid compound is used which will release a minimal amount of water on esterification, such as pyromellitic dianhydride, maleic anhydride, fumaric anhydride, succinic anhydride and the like.

The amounts of polyamine and polyepoxide employed in conducting the methods of this invention and producing the presently provided novel materials will be such as to provide approximately a 1:1 equivalent ratio. By an equivalent is meant a mole divided by the number of the reacting functional groups in the monomer: for example, 1 mole of a diamine, and ⅔ mole of a triamine to 1 mole of a diepoxide provides a 1:1 equivalent ratio. Variations of up to 10 or 20 mol-percent from the stoichiometric ratio may be operable or indeed desirable.

The polymerization method of the present invention will comprise contacting the diamine monomer with the diepoxide in the presence of lithium perchlorate.

In accordance with the method of this invention providing lithium perchlorate catalysis of poly-β-hydroxyamine formation, the reaction mixture need contain only small amounts of this perchlorate, as stated above, while in the case of polymeric solid solution propellants, the polymerization will be effected by contacting the monomers in the presence of an oxidant amount of dissolved lithium perchlorate. More than an oxidant amount of this salt can generally be readily obtained in solutions free of solid phase at temperatures below 100° C. by adding in excess of one mole of lithium perchlorate for mole of diamine or to mixtures of the diamine and diepoxide.

In general, polymerization may be effected at temperatures ranging from 0° C. and below up to any temperature below the decomposition temperatures of reaction mixture components. The polymerization of presently employed reactants to provide the condensation polymers can be accelerated by the application of heat, but in general the system should not be held at temperatures in excess of about 200° C. to preclude the dissociation of the polymer and the possible hazard of effecting an explosive oxidation of the system. Normally polymerization temperatures below about 100° C., such as about 85° C., will be sufficient for most reactants selected.

Usually polymerization is effected simply by maintaining the monomers, in the presence of dissolved lithium perchlorate, in contact with one another at suitable temperatures. If desired, variation of pressure from atmospheric—for example, down to 0.1 mm. Hg or up to 5000 p.s.i.—may be employed. Solvents and diluents, such as plasticizers and the like, discussed in more detail below, may be present. It is sometimes advantageous to employ a catalyst in connection with the practice of the present invention, to promote condensation of the monomers. Thus for example, useful catalysts include ferric acetyl acetonate and similar coordination compounds of transition metals, a base catalyst, such as a tertiary amine such as triethylamine, N,N-diethylcyclohexylamine, N-methylmorpholine, pyridine, 1,4-diazabicyclo-[2.2.2]octane and so forth.

To provide a dense, substantially homogeneous polymer composition it is necessary to preclude the presence of agents in the polymerization system which would cause foam formation therein. Accordingly, where an isocyanate is employed as a reactant, the system should be maintained free from water. Also proper mixing means should be employed to preclude trapping air in the final polymer composition.

After polymerization is complete, it is sometimes advantageous to maintain the polymerized mass at temperatures above ambient temperature for a time, to effect cure or post-cure of the mass.

As the foregoing has indicated, compositions provided in accordance with this invention may consist essentially of a polymer of the kind stated above, and lithium perchlorate in solid solution therein. Such compositions are useful as fuels and monopropellants: they will burn to form energetic gases or, if confined, burn explosively.

Desirably, however, additional components will be present in compositions embodying the present invention. For example, the compositions may comprise polymer-modifying additives such as plasticizers. Internal plasticization is possible with a reactive functional monomer plasticizer, by inclusion in the polymer chain, as by employing a mixture of a major amount, such as 90 mol-percent, of a diamine and a lesser amount, such as 10 mol-percent, of a second polyfunctional monomer such as ethylene glycol. Plasticizing action may also be produced by employing as plasticizer fairly polar solvents such as a completely substituted amine type compound like dimethylformamide or a hydroxy compound which is hindered and thus unreactive such as a substituted cyclohexanol.

Thus, useful plasticizers are illustrated by amides, including sulfonamides such as N-ethyl-p-toluenesulfonamide, N-ethyl-o-toluenesulfonamide, and mixtures thereof, amides and hydrazides such as formamide, dimethylformamide, hydrazodicarbonamide and oxaldihydrazole, and so forth; glycol ethers such as triethyleneglycol dimethyl ether; ethylene glycol dimethyl ether and the like; ethylene glycol; plasticizers having good fuel properties and characterized by the presence of nitro groups, such as 5,5 - dinitro-1,2 - hexanediol, bis(2,2 - dinitropropyl)-formal, 5,5 - dinitro - 1,3 - dioxane, tris(hydroxymethyl)-nitro methane, and the like.

The presence of the plasticizers may render the composition more rubbery and provide a material improvement in tensile elongation of the material. The plasticizer employed will function as a fuel element in the composite solid propellant, and the ratio of lithium perchlorate should be adjusted so that a proper balance is maintained between the oxidant and the fuel combinations to provide complete combustion. The amount of plasticizer employed can vary up to about 35 weight percent of the polymer present in the composition but amounts of from about 15 to about 25 weight percent are generally preferred.

Also, the novel homogeneous, single-phase combinations of lithium perchlorate with polymers provided by this invention can advantageously contain metal and hydride fuels. Thus for example, the propellant compositions may contain finely divided light metals and various hydrides thereof. Examples of these are beryllium, boron, magnesium, aluminum, magnesium hydride, aluminum hydride, the various solid hydrides such as decaborane and alkylated decaboranes (ethyl alkylated decaborane), aluminum borohydride, lithium aluminum hydride, and the like. For example, the homogeneous mixture of lithium perchlorate and the polymer may contain up to about 20% by weight of the total composition of atomized aluminum (particle size about 20 microns). Preferably the aforesaid fuel material should be sufficiently fine to all pass a standard 100 mesh screen, and more preferably should pass a 200 mesh screen.

These light metal and hydride high energy additives should preferably not exceed about 25 weight percent of the total composition, since the heavy combustion exhaust tends to lower performance of the solid propellant composition. It is often desirable to incorporate not more than from 5 to about 10 weight percent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate and the like. Illustrative of useful explosive components are, for example, sodium azide.

The amount of oxidant employed in the solids phase will be adjusted in accordance with the amount of fuel to be burned in the composition and the amount of dissolved oxidant already supplied by the binder. Energetic, gas-supplying decomposable materials not requiring oxidant will usually be employed in gas-deficient systems, and the amount thereof adjusted to supply gas volume sufficient to take up thermal energy available so as to maximize the specific impulse of the system.

Referring to use of the presently provided compositions, when these are polymerization cast directly in a rocket motor, they will generally exhibit adhesive properties, and thereby adhere in polymerization to the cylinder in which they are cast. Due to this adhesive quality, it may be desirable for a core insert to be employed to provide the desired internal cavity to effect proper radial burning of the propellant composition. This may be fabricated from or coated with a material such as polyethylene or polytetrafluoroethylene in order to provide ready release of the insert when polymerization is terminated.

The solid propellant may also be produced by extrusion for insertion in small bore rocket cases. In this case, a small amount of catalyzed liquid polymer composition can first be added to the cylinder case such that the insertion of the extruded mass will displace the liquid polymer, forcing it to rise in the annular space between the extrusion mass and the cylinder wall, whereby the inserted mass is securely bonded within the case. This liquid polymer can be of similar composition to the propellant composition insert, or any other suitable polymer composition which can be readily cured at suitable temperatures, below about 200° C., such as, for example, epoxy resins, polysulfide rubbers and the like.

The lithium perchlorate polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stage of a multi-stage rocket system. The aforesaid compositions are also useful for rocket assisted takeoff, as boosters, sustainers and as pyrotechnics. When confined the aforesaid compositions also are particularly valuable as explosives.

The invention is illustrated but not limited by the following examples in which all parts are by weight unless otherwise noted.

Example 1

This example illustrates the catalysis of poly-β-hydroxyamine formation by lithium perchlorate. Varying amounts of an aliphatic diamine are combined with an epoxy resin and held at 45° C. The diamine structure is an aliphatic saturated hydrocarbon chain of about 13 carbon atoms length, with terminating primary amine groups. The epoxy resin is the bis(glycidyl) ether of 2,2-bis(4-hydroxyphenyl)propane. The following results are observed:

| Epoxy, parts | Amine, parts | Cure (64 hours) |
|---|---|---|
| 4.5 | 5.5 | No. |
| 5.0 | 5.0 | Very tacky. |
| 5.45 | 4.55 | Tacky at surface only. |
| 5.89 | 4.11 | Do. |
| 6.38 | 3.62 | Hard. |

The 50:50 mix will cure at 80° C., in 1.5 hours. Addition of lithium perchlorate catalyzes cure at the 50:50 ratio without heating:

| Binder | | | | |
|---|---|---|---|---|
| Epoxy, parts | Amine, parts | Binder, parts | LiClO₄, parts | Cure |
| 1.0 | 1.0 | 10 | 1 | Instantaneous. |
| 1.0 | 1.0 | 10 | 0.5 | Do. |
| 1.0 | 1.0 | 10 | 0.25 | Do. |

At 100° C., 0.4 part LiClO₄ is dissolved in 1.0 part of the stated amine. It remains dissolved at room temperature. To the mix at room temperature is added 1.0 part of the stated epoxy. Polymerization is instantaneous.

Example 2

This example also illustrates catalysis.

A fluid mixture is prepared by combining 50 parts of a first epoxide with 50 parts of a second epoxide at 85° C. Epoxide No. 1 is the bis(exo-epoxydihydrodicyclopentadienyl) ether of ethylene glycol, and epoxide No. 2 is 3,4-epoxy-6-methyl-cylohexylmethyl 3,4-epoxy-6-methylcyclohexanecarboxylate.

An equimolar amount of trimethylenediamine (24 parts) is added and the mix is held at 85° C. for 18 hours. Slow polymerization can be observed to be occurring at the end of this time.

Two parts of material comprising 67 weight-percent lithium perchlorate is now added. The rate of polymerization promptly increases and polymerization is complete in 3–4 hours.

The above procedure is repeated, but adding the material comprising lithium perchlorate to the mix of epoxides and amine at 85° C. immediately after the latter are mixed. In 5–10 minutes at this temperature polymerization is so far advanced that the mix is too thick to work.

Example 3

This example illustrates the use of lithium perchlorate as a catalyst for polymerization of a diamine with a diepoxide to provide a solid solution of perchlorate in polymer.

A mixture of 73 parts of lithium perchlorate with 551 parts of the bis(epoxydicyclopentyl) ether of ethylene glycol (U.S. 2,543,419) and 178 parts of hexamethylenediamine is heated at 160° C. After 22 hours, a polymeric solid solution of perchlorate which is lemon yellow, hard, clear, non-brittle and adherent to glass is obtained.

Substituting N,N-dimethylhexamethylene diamine in the same system gives extremely slow polymerization.

Only low molecular weight polymer is obtained on heating the above-identified diepoxide with hexamethylene diamine alone.

Example 4

This example illustrates formation of a polymeric solid solution of lithium perchlorate in a polymer made by condensation of trimethylenediamine and a diepoxide, in the presence of ethylene glycol.

Using two different orders of introduction of the reactants, mixtures of 13 parts of trimethylenediamine, 62 parts of the bis(epoxydicyclopentyl) ether of ethylene glycol and 278 parts of lithium perchlorate are heated, and it is found that polymeric solutions are formed.

Example 5

This example illustrates the use of lithium perchlorate as a catalyst for polymerization of a diamine with a diepoxide to provide a solid solution of perchlorate in polymer.

Twenty parts of lithium perchlorate are mixed with 3 parts of trimethylene diamine, 1 part of dipropylenetriamine and 14 parts of the bis(epoxydihydro-exo-dicyclopentadienyl) ether of ethylene glycol. Heating to 90–95° C. produces cure to a solid polymeric solution of dissolved lithium perchlorate.

Example 6

Thirty parts of lithium perchlorate are dissolved in a mixture of 3 parts of trimethylenediamine and 1 part of dimethylacetamide. Then 15.4 parts of the same epoxide as in the above example are added. Cure to a solid polymeric solution of dissolved lithium perchlorate is produced by heating 5 hours at 90° C.

Proceeding similarly but employing 50 parts lithium perchlorate in 3 parts of the diamine plus 2 parts of the amide plasticizing solvent again produces cure to a solid polymeric solution in 5 hours at 90° C.

Example 7

Using two different orders of introduction of the reactants, mixture of 13 parts of trimethylenediamine, 62 parts of the bis(epoxydicyclopentyl) ether of ethylene glycol, 25 parts of ethylene glycol, and 278 parts of lithium perchlorate are heated, and it is found that polymeric solutions are formed.

While the invention has been illustrated with reference to various specific preferred embodiments thereof it is to be appreciated that modifications and variations can be made without departing from the scope of the invention which is limited only as defined in the appended claims.

What is claimed is:

1. The method of preparing a poly-β-hydroxyamine which comprises contacting a polyamine with a polyepoxide in the presence of at least a polymerization-accelerating catalytic amount of lithium perchlorate.

2. The method of forming a polymeric solid solution of lithium perchlorate wherein lithium perchlorate and the polymer are in the same homogeneous phase which comprises polymerizing a polyamine monomer with a polyepoxide monomer in the presence of an oxidant amount of dissolved lithium perchlorate.

3. The method of claim 2, in which the lithium perchlorate is dissolved in said polyamine.

4. The method of claim 2, in which the lithium perchlorate is dissolved in a mixture of the polyamine and the polyepoxide.

5. The method of forming a polymeric solid solution of lithium perchlorate and a poly-β-hydroxyamine in the same homogeneous phase which comprises dissolving an oxidant amount of lithium perchlorate in a diamine and polymerizing the said diamine with a diepoxide.

6. The method of providing a polymeric solid solution of lithium perchlorate containing an amount of lithium perchlorate in the same homogeneous phase as the polymer in excess of the amount soluble in the corresponding monomeric mix which comprises polymerizing diamine with a diepoxide at below about 100° C. in the presence of an amount of lithium perchlorate in excess of about 50 mol-percent of the total of lithium perchlorate and diamine and in excess of the solubility of said perchlorate in the diamine/diepoxide mix.

7. The method of polymerizing a bis(diepoxy-dihydro-exo-dicyclopentadienyl) glycol ether which comprises contacting said ether with about an equivalent of an aliphatic hydrocarbon diamine in the presence of at least a polymerization-accelerating amount of lithium perchlorate.

8. The method of claim 7 in which the hydrocarbon chain of said diamine is trimethylene.

9. The method of claim 7 in which the hydrocarbon chain of said diamine is hexamethylene.

10. The method of claim 7 in which the said ether is dissolved in a fluid epoxidized cycloaliphatic ester.

11. The method of claim 7 in which the diamine/diepoxide mix includes an aliphatic N,N-dialkyl amide comprising dimethyl-acetamide.

12. As a novel polymeric material, a polymeric solid solution of lithium perchlorate and a poly-$\beta$-hydroxyamine in the same homogeneous phase.

13. The product of claim 12, in which said product includes an oxidant amount of dissolved lithium perchlorate.

14. A composite solid propellant composition comprising energy-rich solids and as the binder therefor, the product of claim 13.

References Cited

UNITED STATES PATENTS

| | | | |
|---|---|---|---|
| 2,994,685 | 8/1961 | Delmonte et al. | 260—47 |
| 2,975,155 | 3/1961 | Capron et al. | 260—47 |
| 3,067,170 | 12/1962 | Carey | 260—47 |
| 3,028,271 | 4/1962 | Dixon et al. | 149—19 |
| 3,054,702 | 9/1962 | Stengel et al. | 149—19 |
| 3,094,444 | 7/1963 | Hedrick et al. | 149—19 |

BENJAMIN R. PADGETT, *Primary Examiner.*

U.S. Cl. X.R.

149—20; 83, 109